United States Patent [19]

Koral et al.

[11] Patent Number: 5,081,581
[45] Date of Patent: * Jan. 14, 1992

[54] CORRECTION FOR COMPTON SCATTERING BY ANALYSIS OF ENERGY SPECTRA

[75] Inventors: Kenneth F. Koral; W. Leslie Rogers; Neal H. Clinthorne; Xiaohan Wang, all of Ann Arbor, Mich.

[73] Assignee: The University of Michigan, Ann Arbor, Mich.

[*] Notice: The portion of the term of this patent subsequent to Jun. 13, 2006 has been disclaimed.

[21] Appl. No.: 331,993

[22] Filed: Mar. 31, 1989

Related U.S. Application Data

[63] Continuation-in-part of Ser. No. 53,242, May 22, 1987, Pat. No. 4,839,808.

[51] Int. Cl.$^5$ .............................................. G01T 1/161
[52] U.S. Cl. ................................... 364/413.24; 378/87
[58] Field of Search .................. 378/5, 6, 7, 82, 86, 378/87, 901; 364/413.24

[56] References Cited

U.S. PATENT DOCUMENTS

| | | | |
|---|---|---|---|
| 4,029,963 | 6/1977 | Alvarez et al. | 378/5 |
| 4,149,081 | 4/1979 | Seppi | 378/5 |
| 4,839,808 | 6/1989 | Koral et al. | 364/413.24 |

FOREIGN PATENT DOCUMENTS 0089785 5/1985 Japan .
0083983 4/1986 Japan .

*Primary Examiner*—Clark A. Jablon
*Attorney, Agent, or Firm*—Rohm & Monsanto

[57] ABSTRACT

A system for removing the effects of Compton scattering in systems such as tomographic scanning and radioisotope imaging arrangements, which detect gamma rays, utilizes the smoothness of the Compton component over the image to reduce computing time. Data responsive to energy states of the photons which are detected are received and values corresponding thereto are stored in at least one memory location. In some embodiments, where imaging is the ultimate function of the gamma ray detection system, the data correspond to predetermined image grid points. Also, the data which is stored is processed so as to be separated into a first data set corresponding to unscattered ones of the detected photons and a second data set corresponding to scattered ones of the detected photons. The gamma ray detection arrangement is calibrated by acquiring a spectral shape corresponding to unscattered photons. The processing utilizes non-linear least squares fitting analysis. The first data set is summed within specified limits, for determining a number of the unscattered ones of the detected photons. A scatter-free image can then be formed from this data set.

6 Claims, 2 Drawing Sheets

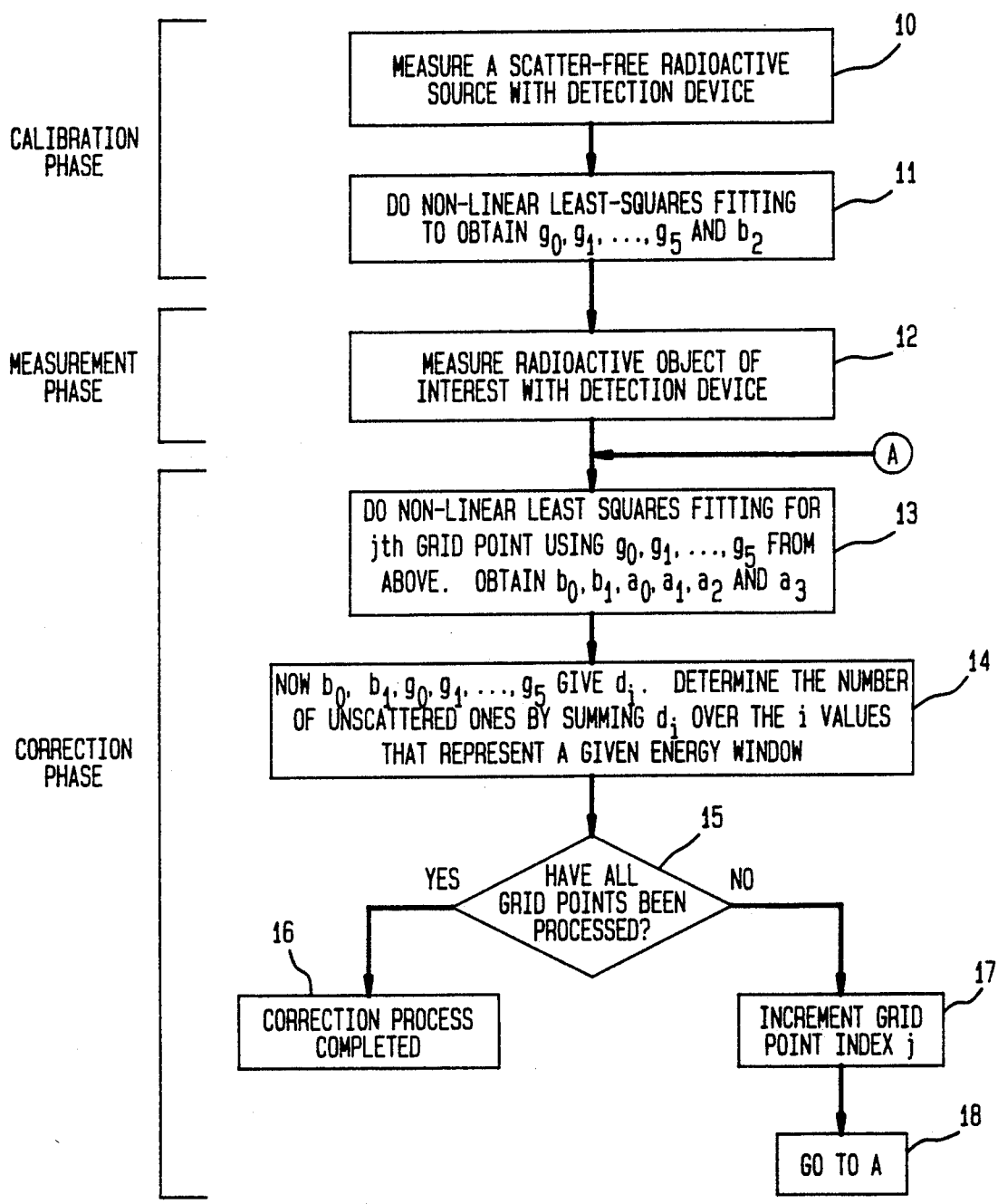

CORRECTION FOR COMPTON SCATTERING BY ANALYSIS OF ENERGY SPECTRA

RELATIONSHIP TO OTHER PATENT APPLICATION

This application for United States Letters Patent is a continuation-in-part of Ser. No. 053,242, filed May 22, 1987, now U.S. Pat. No. 4,839,808, and assigned to the same assignee as herein.

BACKGROUND OF THE INVENTION

This invention relates generally to systems for radioisotope imaging, and more particularly, to a system for improving radioisotope imaging systems by eliminating the effects of Compton scattered gamma rays.

Cameras of the type used in radioisotope imaging are intended to generate an accurate assessment of the distribution of the isotope within an object under investigation. Such imaging is achieved from the outside of the object, in a noninvasive manner. In scintillation camera systems, gamma rays are detected by use of a solid crystal, which typically may be made of sodium iodide or bismuth germanate (BgO). A collimation system and a computation algorithm are employed to establish the correspondence between the location where the gamma ray is detected and the location within the object where the gamma ray originated. Over a period of time, many gamma rays are detected, and the distribution of the isotope within the object can be determined therefrom.

It is well known that gamma rays which are emitted from within an object are subject to interaction with the matter of the object. Such interaction generally takes the form of Compton scattering, which always results in a diminution in the energy of the interacting gamma ray and a change in its direction of travel. Compton scattered gamma rays therefore approach the scintillation camera along a path which differs from that of its origin. If the fact that these gamma rays are Compton scattered is not detected, and therefore they are processed as though they approach the scintillation camera directly from the point of origin, the gamma rays will be assigned incorrectly, and the determined distribution of radioisotope within the object will be incorrect.

One prior art approach to the problem of misassignment of gamma rays involves the detection of the energy content of the gamma rays received. If a gamma ray received at the scintillation camera has lost a relatively large amount of energy, it is presumed that the gamma ray has been subjected to Compton scattering, and is not accepted for further processing. It is a problem with this known approach, however, that the determination of energy content of the gamma rays is not accurately conducted, and therefore a relatively large energy window has to be used so that most of the unscattered gamma rays, or direct gamma rays, will be accepted. Failure to accept for processing a large number of direct gamma rays will result in poor imaging performance. However, the use of a wide energy window results in the acceptance for processing of a significant number of scattered gamma rays, which also results in poor imaging performance.

In one known system for the rejection of scattered gamma rays, the energy window was set symmetrically about the peak of the energy distribution. This peak corresponds generally to the number of gamma rays as a function of their energy. In other systems, the energy window was set asymmetrically about the energy peak. Other known systems obtain energy distributions for different spatial locations on the planar surface of the scintillation camera, and use different energy windows for different spatial locations.

The use of a single energy window does not achieve the desired result of rejecting the gamma rays which have undergone Compton scattering. As the width of the energy window is reduced, or is set asymmetrically toward higher energies, the ratio of scattered gamma rays to direct gamma rays, which are accepted for processing, decreases. However, the total number of direct gamma rays is also reduced. This results in the further problem that statistical fluctuations in the determined radioisotope distribution have greater effect in degrading the imaging performance. Therefore, to avoid unacceptable statistical fluctuations, the energy window must be made sufficiently large, and a significant number of Compton scattered gamma rays are also accepted for processing. The use of energy windows which vary with spatial location reduces the degradation of imaging performance caused by the statistical fluctuations to an extent, but does not eliminate the problem entirely.

A still further known system for rejection of Compton scattered gamma ray utilizes two energy windows. One such window is set symmetrically about the direct peak of the energy distribution, and the other energy window, of equal width, is set adjacent to the symmetrically set energy window, but at lower energies. A fraction of the image of the radioisotope distribution which is reconstructed from the gamma rays accepted within the energy window of reduced energy is subtracted from the image reconstructed from the direct, or unscattered, gamma rays.

It has been learned that the fraction, k, which is used to multiply the image resulting from the lower energy window before subtraction from the upper window is slightly dependent upon the size of the outer, non-radioactive, water-filled object containing a radioactive sphere. The value of the fraction k might also depend on the shape of the outer object, the size and shape of the radioactive object, the distribution of attenuation coefficients and the distribution of background radioactivity within the outer object. Thus, this known technique is difficult to implement.

It is, therefore, an object of this invention to provide a system which improves the imaging performance of radioisotope imaging systems.

It is another object of this invention to provide a system which eliminates Compton scattered gamma rays from inclusion in the processing of a radioisotope distribution image.

It is also an object of this invention to provide a system which rejects gamma rays which have been Compton scattered from final image formation for any distribution of radioisotope.

It is a further object of this invention to provide a system which rejects gamma rays which have been Compton scattered from final image formation using feasible computation techniques.

It is additionally an object of this invention to provide a system which rejects gamma rays which have been Compton scattered from final image formation, and which is suitable for singlephoton projection (planar) imaging.

It is yet a further object of this invention to provide a system which rejects gamma rays which have been Compton scattered from final image formation, and which is suitable for single photon emission computed tomography (SPECT).

It is also another object of this invention to provide a system which rejects gamma rays which have been Compton scattered from final image formation, and which is suitable for positron emission computed tomography (PET).

It is yet an additional object of this invention to provide a system which rejects gamma rays which have been Compton scattered from final image formation, and which is suitable for use with radioisotope imaging systems which use sodium iodide (NaI) scintillation crystal material.

It is still another object of this invention to provide a system which rejects gamma rays which have been Compton scattered from final image formation, and which is suitable for use with radioisotope imaging systems which use bismuth germanate (BgO) scintillation crystal material.

It is a yet further object of this invention to provide a system which facilitates quantitatively accurate reconstruction of a radioisotope distribution image.

It is also a further object of this invention to provide a system which rejects gamma rays which have been Compton scattered from final image formation, but which allows for all of the direct gamma rays which are detected to be used for formation of the image.

It is additionally another object of this invention to provide a system which utilizes in the formation of a radioisotope image additional information obtained from a scatter-free calibration step.

Yet another object of this invention is to eliminate the need for repeated remeasurement of a calibration function, whereby variation in the relative state of the system is tolerated.

A still further object of this invention is to provide a system for eliminating Compton scattered gamma rays which can be applied to any number of tomographically reconstructed planes through the body.

An additional object of this invention is to provide a system for eliminating Compton scattered gamma rays while reducing computation time.

SUMMARY OF THE INVENTION

The foregoing and other objects are achieved by this invention which provides, in a first method aspect thereof, a method of reducing the effects of photons which are subjected to Compton scattering in a gamma ray detection system. In accordance with this aspect of the invention, data responsive to energy states of the photons which are detected are received and values corresponding thereto are stored in at least one memory location. In some embodiments, where imaging is the ultimate function of the gamma ray detection system, the data correspond to predetermined image grid points. In accordance with the invention, the data which is stored is processed so as to be separated into a first data set corresponding to unscattered ones of the detected photons and a second data set corresponding to scattered ones of the detected photons. The first data set is summed within specified limits, for determining a number of the unscattered ones of the detected photons. Subsequently, an image is formed utilizing the number of the unscattered ones of the detected photons.

The system of U.S. patent application Ser. No. 053,242, now U.S. Pat. No. 4,839,808, which is assigned the same assignee as herein, involves acquiring the energy spectrum of the gamma rays and fitting that spectrum by linear least squares to separate scattered from unscattered gamma rays. This fitting, however, involves a calibration function which requires occasional remeasurement to assess the state of the detection device. This creates a problem of inconvenience in the practice of that system.

It is an significant advantage of the present invention that the calibration function is used to assess the intrinsic features of the detection apparatus. This assessment needs to be performed only once for each radioisotope. Then, non-linear least squares fitting is employed since it allows for variation in the relative state of the detection apparatus.

Prior to performing the step of processing, there is performed the further step of calibrating the gamma ray detection arrangement. This preferably is achieved by acquiring, in a substantially scatter-free manner, a spectral shape called a "calibration function" which is expected to correspond to said first data set.

The shape of the Compton scattering spectrum is assumed to be given by a polynomial of order N. For example, if $N=3$:

$$c_i = a_0 + a_1 i + a_2 i^2 + a_3 i^3 \qquad \text{Eq. 1}$$

where $c_i$ is the number of counts in an energy bin, i is the number of the bin, and $a_0$, $a_1$, $a_2$, and $a_3$ are parameters to be determined from the fitting. The nonscattered spectrum, $d_i$, is assumed given by:

$$d_i = b_0[g_0 e^{-(i-b_1)^2/2g_1^2} + g_2 + g_3(i-b_1) + g_4(i-b_1)^2 + g_5(i-b_1)^3] \qquad \text{Eq. 2}$$

where $b_0$ and $b_1$ are parameters to be found from the fitting, $g_0$, $g_1$, $g_2$, $g_3$, $g_4$, and $g_5$ are determined from the scatter-free spectrum and a third order polynomial is used for the tail of that spectrum, though another order could be used.

Then the total spectrum, $\bar{y}_i$, is the sum of the scattered and unscattered components:

$$\bar{y}_i = c_i + d_i \qquad \text{Eq. 3}$$

If the experimental spectrum is $y_i$, the parameters are found by getting the best fit between $\bar{y}_i$ and $y_i$.

After the parameters are set, the Compton scattering spectrum is given by Eq. 1.

In the practice of the present invention, non-linear least squares fitting can be achieved as follows:

Let the bin numbers of interest for the fitting run from $i=n_1$ to $i=n_2$, and define a measure of the goodness of the fit $X^2$:

$$"X^2 = \sum_{i=n_1}^{n_2} \left\{ \frac{1}{\sigma_i^2} [\bar{Y}_i - Y_i] \right\}" \qquad \text{Eq. 4}$$

to $$X^2 = \sum_{i=n_1}^{n_2} \left\{ \frac{1}{\sigma_i^2} [\bar{Y}_i - Y_i]^2 \right\};$$

where $\sigma_i$ is an estimate of the error in $Y_i$.

According to the method of least squares, the optimum values of the parameters ($a_j$ and $b_k$) are obtained by minimizing $X^2$ with respect to each of the parameters simultaneously:

$$\frac{\delta}{\delta a_j} X^2 = \frac{\delta}{\delta a_j} \Sigma \left\{ \frac{1}{\sigma_i^2} (\overline{Y}_i - Y_i)^2 \right\} = 0; j = 0, \ldots, N \quad \text{Eq. 5}$$

$$\frac{\delta}{\delta b_k} X^2 = \frac{\delta}{\delta b_k} \Sigma \left\{ \frac{1}{\sigma_i^2} (\overline{Y}_i - Y_i)^2 \right\} = 0; k = 0, 1 \quad \text{Eq. 6}$$

Since $d_i$ is not linear in its parameters ($b_0$ and $b_1$), the method for solving the fitting problem is called non-linear least squares fitting. Procedures for solving such problems are described in a book entitled "Data Reduction and Error Analysis for the Physical Sciences," by P. R. Bevington, pp. 204-246. A preferred embodiment for the present invention is the Marquardt algorithm, at pages 235-241 of this reference.

The method by which the parameters $g_0$, $g_1$, $g_2$, $g_3$, $g_4$, and $g_5$ are determined from the scatter-free spectrum is as follows. Let that spectrum be given by $\overline{s}_i$, the number of counts in bin i. Assume:

$$s_i = g_0 e^{-(i-b_2)^2/2g_1^2} + g_2 + g_3(i-b_2) + g_4(i-b_3)^2 + g_5(i-b_2)^3 \quad \text{Eq. 7}$$

when a third-order polynomial is used for the tail.

Let the measured spectrum be given by $s_i$, the measured number of counts in bin i. Define:

$$"X_s^2 = \sum_{i=n_1}^{n_2} \left\{ \frac{1}{\sigma_i^2} [\overline{s}_i - s_i] \right\}" \quad \text{Eq. 8}$$

to $$X_s^2 = \sum_{i=n_1}^{n_2} \left\{ \frac{1}{\sigma_i^2} [\overline{s}_i - s_i]^2 \right\};$$

where $X_s$ is a measure of the goodness of fit for the scatter-free spectrum and $\sigma_i$ is the estimate of error in the value $s_i$.

Then again apply non-linear least squares fitting to determine the parameters $g_0$, $g_1$, $g_2$, $g_3$, $g_4$, $g_5$, and $b_2$ using preferably the Marquardt algorithm. This time the partial derivatives are taken with respect to $g_l$, $l = 0, \ldots, 5$ and with respect to $b_2$. The possibility that $b_2$ can be different from $b_1$ is an example of the allowance for variation in the relative state of the detection apparatus.

BRIEF DESCRIPTION OF THE DRAWING

Comprehension of the invention is facilitated by reading the following detailed description in conjunction with the annexed drawing, in which FIG. 2 is a flow chart representation of a method which is performed in accordance with the invention.

DETAILED DESCRIPTION

Figure 1:
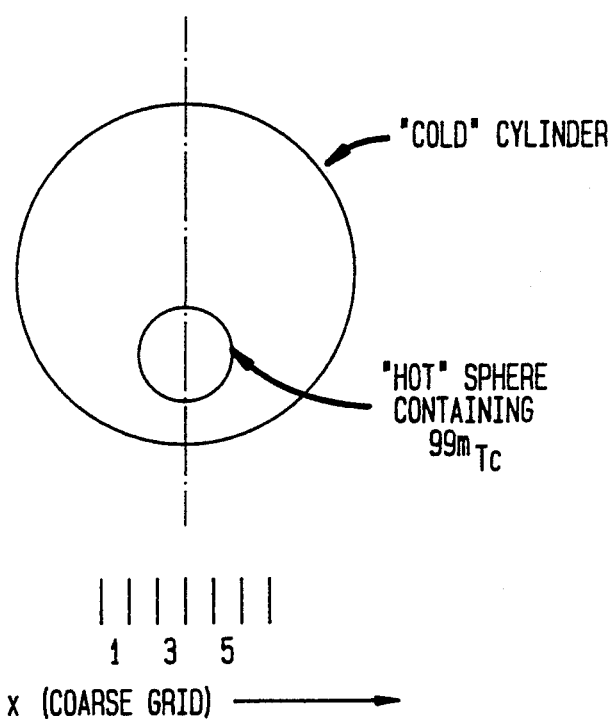
FIG. 1 is a schematic representation of a phantom used to achieve the experimental results reported herein.

The present invention is based on the hypothesis that complete energy spectra at individual spatial locations in each view can be analyzed to separate the Compton scattering component from the unscattered component. This hypothesis is tested by computing scatter fractions for an experimental phantom and comparing them with the results from linear least squares fitting and from Monte Carlo simulations.

Measurement of Experimental Data

As can be seen from FIG. 1, the isotope employed was $^{99m}Tc$, and the camera-collimator system was a GE 400AT camera with a low-energy general purpose collimator. Acquisition mode was 64 by 64 word.

The phantom examined was a 20.5 cm cylinder containing a 6 cm diameter sphere. The phantom was provided with an adaptation so that it could be cantilevered over the top edge of the patient imaging table. In this manner, there was no attenuation or scattering resulting from the table.

The cylinder had its axis parallel to the face of the Anger camera. The sphere was located with its center 5.5 cm from the axis of rotation of the cylinder and directly towards the camera from that axis. The sphere contained radioactive water, while the cylinder contained non-radioactive water.

Spatially dependent spectra were obtained in the following manner: A very narrow (2 keV) window was set at the lowest energy of interest, illustratively between 108 to 110 keV. An image of the object was acquired for a fixed time and stored. The window was then advanced to 110 to 112 keV and an acquisition obtained. This procedure was repeated 32 times in all. When the number of counts at any given position in the image was plotted versus energy, the desired spectra is revealed.

Analysis of Spectra

Spectra were obtained using the MDS $A^2$ computer by placing 4×4 pixel region of interest (x by y) on successive images. The spectra were analyzed by the method of non-linear least squares, as described hereinabove, to obtain estimates of the spectra of Compton scattering events.

Scatter Fraction

Once the spectrum at a given spatial location is separated into unscattered and Compton scattered components, the scattered fraction, SF, can be calculated. This parameter is defined as:

$$SF = \frac{S}{U}$$

where S is the total Compton scattered counts and U is the total unscattered counts which is used to form the final image. The total values are obtained from the respective spectra by summation. That is:

$$S = \sum_{i=n_1}^{n_2} c_i$$

$$U = \sum_{i=n_1}^{n_2} d_i$$

Monte Carlo Simulation

To provide a verification of the accuracy of the scatter fractions computed from non-linear least-squares fitting, spectra for the radioactive sphere in the non-radioactive cylinder were also computed by the method of Monte Carlo simulation. The computer program described in "Energy and Spatial Distribution of Multiple Order Compton Scatter in SPECT: a Monte Carlo Investigation," Phys. Med. Biol. 29, 1217-1230, 1984, by C. E. Floyd, R. J. Jaszczak, C. C. Harris, and R. E. Coleman, was used. Since the scattered and unscattered gamma rays can be separated by the mathematical simulation, separate spectra are obtained. Scatter fractions at individual spatial locations corresponding to those of the experimental measurements are then computed as described hereinabove.

RESULTS

Scatter Fraction

The following tables illustrate the scatter fraction as a function of position as computed from the fitting. The results are presented versus location number. Location 3.5 is the center line, and location 1 is at the edge of the radioactive sphere along a diameter of the cylinder.

Table 1 is the scatter fraction as a function of location comparing results from non-linear fitting described herein, to linear fitting.

TABLE 1

| Scatter Fraction, SF, as a Function of Location | | | |
|---|---|---|---|
| Location Number | 1 | 2 | 3 |
| Nonlinear Fitting | 0.462 | 0.179 | 0.177 |
| Linear Fitting | 0.555 | 0.200 | 0.201 |

It is seen from the table that there is some tendency for non-linear fitting to produce a smaller scatter fraction.

Table 2 is the same result from non-linear fitting compared to the result obtained from Monte Carlo simulation. It is seen that there is excellent agreement, in general. At the edge of the radioactive sphere (location 1), the noise in both methods is greater, and the difference in SF is attributed to the noise.

TABLE 2

| Scatter Fraction, SF, as a Function of Location | | | |
|---|---|---|---|
| Location Number | 1 | 2 | 3 |
| Nonlinear Fitting | 0.462 | 0.179 | 0.177 |
| Monte Carlo | 0.400 | 0.172 | 0.172 |

FIG. 2 is a flow chart representation of a method which is performed in accordance with the principles of the invention. As shown, steps 10 and 11 comprise the calibration phase. At step 10, a detection device is employed to measure a scatter-free radioactive source. A non-linear least squares fitting is then performed at step 11 to obtain the parameters $g_0, g_1, \ldots, g_5$, and $b_2$.

Step 12 comprises the measurement phase of the process. At this point, the detection device is employed to measure the radioactive object of interest. After step 12, the process enters the correction phase.

Step 13 through 18 comprise the correction phase of the process. At step 13, a non-linear least squares fitting is performed for the $j^{th}$ grid point using the parameters $g_0, g_1, \ldots, g_5$ from above. Subsequently, the parameters $b_0, b_1, a_0, a_1, a_2,$ and $a_3$, are obtained. As previously indicated, these parameters are obtained from the fitting.

At step 14, the parameters $b_0, b_1, g_0, g_1, \ldots, g_5$ are used to provide $d_i$, in accordance with the relationship set forth above in eq. 2. The number of unscattered components is determined by summing $d_i$ over the i values which represent a given energy window.

When it is determined at step 15 that all of the grid points have been processed, the correction process is terminated at step 16. However, if all grid points have not been processed, then the value j is incremented at step 17, and the process is looped at step 18 to the beginning of step 13.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and descriptions in this disclosure are proffered to facilitate comprehension of the invention, and should not be construed to limit the scope thereof.

What is claimed is:

1. A method of reducing the effects of Compton scattered photons detected in a gamma ray detection arrangement, the method comprising the steps of:
   receiving data responsive to energy states of the detected photons and storing said data in memory locations corresponding to predetermined image grid points;
   calibrating the gamma ray detection arrangement by acquiring a spectral shape corresponding to a calibration function which is expected to correspond to a first data set corresponding to unscattered ones of the detected photons;
   processing said stored data for at least selected ones of said predetermined grid points for separating said stored data into said first data set corresponding to unscattered ones of the detected photons and a second data set corresponding to scattered ones of the detected photons;
   performing a non-linear least squares fit between said stored data and a predetermined function which depends upon at least a portion of said calibration function;
   summing said first data set for each of said selected ones of said predetermined grid points for determining a number of said unscattered ones of said detected photons; and
   forming an image utilizing said number of said unscattered ones of said detected photons.

2. The method of claim 1 wherein said selected ones of said predetermined number of points correspond to a coarse imaging grid of said image.

3. The method of claim 2 wherein there is provided the further step of interpolating between said selected ones of said predetermined number of points corresponding to said coarse grid to produce a greater number of points, said greater number of points corresponding to a fine imaging grid.

4. The method of claim 3 wherein said greater number of points corresponds to said predetermined number of points.

5. A method for reducing the effects of Compton scattered photons detected in a gamma ray detection arrangement, the method comprising the steps of:
   receiving data responsive to energy states of the detected photons and storing said data in memory locations corresponding to a predetermined number of image grid points;
   grouping said stored data, whereby a coarser grid having fewer image grid points is produced;
   calibrating the gamma ray detection arrangement by acquiring an image shape corresponding to a calibration function which is expected to correspond to a first data set;
   processing said data corresponding to said image grid points on said coarser grid for separating said stored data into a first data set corresponding to unscattered ones of the detected photons and a second data set corresponding to scattered ones of the detected photons, said step of processing further comprising performing a non-linear least squares fit between said stored data and said calibration function;

summing said second data set for each of said predetermined grid points on said coarser grid for determining a number of said scattered ones of said detected photons;

interpolating from said second data set for each of said predetermined grid points on said coarser grid for producing a data set corresponding to said scattered ones of the detected photons for each of said predetermined number of grid points;

subtracting said data set corresponding to said scattered ones of the detected photons for each of said predetermined number of grid points from said data stored corresponding to the detected photons, to produce at each of said predetermined number of grid points a data set corresponding to unscattered ones of the detected photons; and forming an image utilizing said number of said unscattered ones of said detected photons.

6. A method for reducing the effects of Compton scattered photons detected in a gamma ray detection arrangement, the method comprising the steps of:

receiving data responsive to energy states of the detected photons and storing said data in memory locations corresponding to a predetermined number of image grid points;

grouping said stored data, whereby a coarser grid having fewer image grid points is produced;

processing said data corresponding to said image grid points on said coarser grid in accordance with a non-linear least squares fitting for separating said stored data into a first data set corresponding to unscattered ones of the detected photons and a second data set corresponding to scattered ones of the detected photons;

summing said first data set for each of said predetermined grid points on said coarser grid for determining a number of said unscattered ones of said detected photons;

interpolating from said first data set for each of said predetermined grid points on said coarser grid for producing a data set corresponding to said unscattered ones of the detected photons for each of said predetermined number of grid points; and forming an image utilizing said number of said unscattered ones of said detected photons.

* * * * *